United States Patent
McAuley et al.

(10) Patent No.: US 12,453,622 B2
(45) Date of Patent: Oct. 28, 2025

(54) METHODS FOR MANUFACTURING AN ORAL APPLIANCE

(71) Applicant: AirWay Technologies, LLC, Carrollton, TX (US)

(72) Inventors: Alastair E. McAuley, Auckland (NZ); Charles F. Collins, Dallas, TX (US)

(73) Assignee: AirWay Technologies, LLC, Farmers Branch, TX (US)

( * ) Notice: Subject to any disclaimer, the term of this patent is extended or adjusted under 35 U.S.C. 154(b) by 1476 days.

(21) Appl. No.: 16/756,055

(22) PCT Filed: Oct. 5, 2018

(86) PCT No.: PCT/US2018/054497
§ 371 (c)(1),
(2) Date: Apr. 14, 2020

(87) PCT Pub. No.: WO2019/071063
PCT Pub. Date: Apr. 11, 2019

(65) Prior Publication Data
US 2021/0369422 A1     Dec. 2, 2021

Related U.S. Application Data

(60) Provisional application No. 62/568,878, filed on Oct. 6, 2017.

(51) Int. Cl.
*A61C 13/00*     (2006.01)
*A61C 7/08*     (2006.01)
(Continued)

(52) U.S. Cl.
CPC ............ *A61C 13/0006* (2013.01); *A61C 7/08* (2013.01); *A61C 13/0022* (2013.01);
(Continued)

(58) Field of Classification Search
CPC ........................................................ A61C 7/08
See application file for complete search history.

(56) References Cited

U.S. PATENT DOCUMENTS

| | | |
|---|---|---|
| 4,240,415 A | 12/1980 | Wartman |
| 5,692,894 A * | 12/1997 | Schwartz ................. A61C 7/08 433/6 |

(Continued)

FOREIGN PATENT DOCUMENTS

| | | |
|---|---|---|
| DE | 202013001392 U1 | 4/2013 |
| EP | 3691897 A1 | 8/2020 |
| WO | WO19/71063 | 4/2019 |

OTHER PUBLICATIONS

Extended European Search Report for Application No. 18864163.3 (PCT/US2018054497) dated Jul. 2, 2021.
(Continued)

*Primary Examiner* — Benjamin A Schiffman
(74) *Attorney, Agent, or Firm* — Patterson + Sheridan, LLP; Charles Yeh

(57) ABSTRACT

A method includes forming a first layer of a disk, the first layer comprising a first material and forming a second layer of the disk by depositing a second material on the first layer. The method further includes irradiating at least the second layer of the disk to cross-link the second material. The first material has a higher melting point than the second material, and the dual-layer disk is configured to be thermoformed into an oral appliance.

11 Claims, 5 Drawing Sheets

(51) Int. Cl.
  *B29C 35/08*   (2006.01)
  *B29C 51/10*   (2006.01)
  *B29C 35/02*   (2006.01)

(52) U.S. Cl.
  CPC .............. *B29C 35/08* (2013.01); *B29C 51/10* (2013.01); *B29C 2035/0283* (2013.01)

(56) References Cited

U.S. PATENT DOCUMENTS

| | | | |
|---|---|---|---|
| 5,709,548 | A | 1/1998 | Oxman et al. |
| 7,641,828 | B2* | 1/2010 | DeSimone ............... A61C 7/08 |
| | | | 264/16 |
| 7,819,925 | B2 | 10/2010 | King et al. |
| 8,905,756 | B2 | 12/2014 | Schwartz |
| 10,596,026 | B2* | 3/2020 | Thornton .......... A61M 16/0605 |
| 2001/0041320 | A1* | 11/2001 | Phan ...................... A61C 19/00 |
| | | | 433/24 |
| 2009/0087812 | A1 | 4/2009 | Andersen |
| 2014/0053852 | A1* | 2/2014 | Thornton .......... A61M 16/0683 |
| | | | 128/862 |
| 2015/0013688 | A1 | 1/2015 | Frantz et al. |
| 2015/0059769 | A1* | 3/2015 | Powers ................ A41D 13/015 |
| | | | 433/214 |
| 2015/0209120 | A1 | 7/2015 | Hannapel et al. |
| 2016/0081767 | A1* | 3/2016 | Metcalf .................... A61C 7/08 |
| | | | 433/6 |
| 2017/0007362 | A1 | 1/2017 | Chen et al. |
| 2017/0049607 | A1* | 2/2017 | Thornton ................. A61C 7/36 |
| 2017/0056131 | A1* | 3/2017 | Alauddin ............... A61C 19/04 |
| 2018/0368961 | A1* | 12/2018 | Shanjani ............... A61B 5/4547 |
| 2021/0369422 | A1 | 12/2021 | McAuley et al. |

OTHER PUBLICATIONS

Office Action received for Mexican Patent Application No. MX/A/2020/003968, mailed on Jan. 9, 2025, 6 pages of Original document only.
Canadian Patent Office, Office Action for Canadian Patent Application No. 3,075,944, dated Dec. 8, 2023.

* cited by examiner

METHODS FOR MANUFACTURING AN ORAL APPLIANCE

RELATED APPLICATION

This application claims priority to PCT/US18/54497 filed Oct. 5, 2018, entitled "Methods for Manufacturing an Oral Appliance," which claims the benefit of U.S. Provisional Application Ser. No. 62/568,878 filed Oct. 6, 2017 entitled "Methods for Manufacturing an Oral Appliance" which are incorporated herein by reference.

TECHNICAL FIELD

This invention relates generally to oral appliances, and more particularly to methods for manufacturing oral appliances.

BACKGROUND

Oral appliances may be used by a number of people in different situations. For example, oral appliances may be used to correct or maintain the position of teeth (e.g., braces, retainers), to improve a user's breathing (e.g., dental devices used in the treatment of sleep breathing disorders), and to protect or prevent injury to the mouth (e.g., mouth guard). In some instances, oral devices may be customized to fit a particular user's mouth.

SUMMARY OF THE DISCLOSURE

Figure 1A:
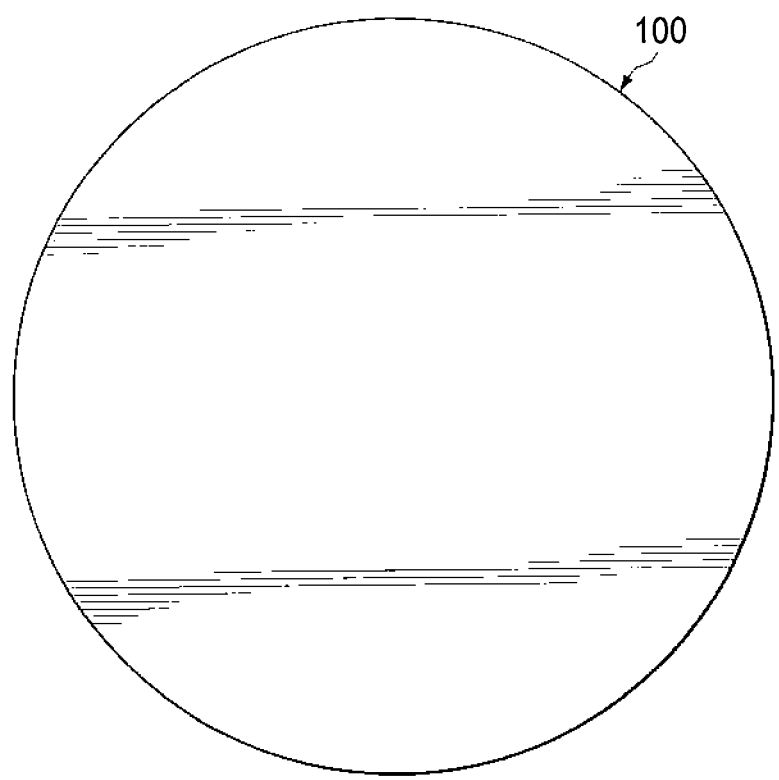
FIG. 1A illustrates a top view of a dual-layer disk, according to one embodiment.

In accordance with the present invention, certain disadvantages and problems associated with an adjustable breathing device may be reduced or eliminated.

According to one embodiment, a method includes forming a first layer of a disk, the first layer comprising a first material; and forming a second layer of the disk by depositing a second material on the first layer. The method further includes irradiating at least the second layer of the disk to cross-link the second material, wherein the first material has a higher melting point than the second material and the dual-layer disk may be configured to be thermoformed into an oral appliance.

According to another embodiment, a method of thermoforming an oral appliance includes inserting a dual-layer disk into a pressure chamber of a pressure molding machine, wherein the dual-layer disk comprises a first layer and a second layer. The first layer comprises a first material and the second layer comprises a second material, the first material having a higher melting point than the second material; and the second material being cross-linked by irradiation. The method further includes positioning an oral mold on a molding platform of the pressure molding machine and applying heat to the dual-layer disk using a heating element, wherein applying heat to the dual-layer disk causes the first material and the second material to melt. The method further includes positioning the heated dual-layer disk above the oral mold and applying pressure to the heated dual-layer disk to cause the first material and the second material to form over the oral mold.

Certain embodiments of the invention may provide one or more technical advantages. Example technical advantages of some embodiments may include providing improved comfort, customization, and/or configurability of oral devices. Certain embodiments may improve the speed of manufacturing customized oral appliances relative to conventional methods of manufacturing the same. Another technical advantage of certain embodiments may include providing user-friendly adjustment mechanisms for adjusting portions of the oral appliance. Certain embodiments may provide an oral appliance with an improved fit based on the precise custom orientation or positional relationship between a user's unique facial structure and the user's teeth. Certain embodiments may provide a custom oral appliance having a desired level of retention without having to apply blockout material to an oral mold. Certain embodiments may provide an oral appliance with sufficient flexibility accommodate dental shifts, which may mitigate the need for subsequent replacement. Certain embodiments may provide simplified or more cost-effective techniques for forming oral appliances. Furthermore, certain embodiments may provide improved durability, which may mitigate the need for subsequent repair or replacement. Certain embodiments of the invention may include none, some, or all of the above technical advantages. One or more other technical advantages may be readily apparent to one skilled in the art from the figures, descriptions, and claims included herein.

DETAILED DESCRIPTION

As used herein, an oral appliance refers to any device that may be worn in or around the mouth. Oral appliances may include braces, retainers, dental devices, mouth guards, and bite splints. Oral appliances that are customized to fit a particular user's mouth and/or dentition are referred to herein as custom oral appliances. Because custom oral appliances are specially created for a particular person, they are generally manufactured at a laboratory and are not available over-the-counter. Typically, custom oral appliances are formed from a dental impression or molding that may, in some instances, be taken or created by a dental practitioner. The dental impression or molding is then sent to a laboratory where an oral appliance may be manufactured based on the impression or molding. The manufactured oral appliance is then typically sent back to the dental practitioner who fits a user with the oral appliance. Unfortunately, custom oral appliances produced using conventional methods of manufacture are generally formed of inflexible materials that cannot be adjusted once manufactured. As a result, custom oral appliances do not always fit a particular user properly and/or comfortably. In some cases, several custom appliances may be manufactured for a particular user before the user is satisfied with the appliance. However, even after a user is satisfied with a custom appliance, the usable lifespan of the oral appliance may be limited by natural oral changes such as teeth shifting. Thus, it is not uncommon for a custom device offering a perfect fit to fail to deliver on its promise.

The present disclosure contemplates methods for manufacturing oral appliances that offer flexibility post-manufacture to accommodate user preferences, oral changes, and/or other modifications. Specifically, this disclosure contemplates thermoforming an oral appliance from a dual-layer disk comprising a moldable material such as a cross-linked thermoplastic. Certain benefits may be realized by manufacturing an oral appliance comprising a cross-linked thermoplastic material. For example, an oral appliance may be re-molded post-manufacture to accommodate user preferences, oral changes, and/or other modifications thus improving user comfort and increasing the usable lifespan of the oral appliance. This disclosure also recognizes that manufacturing an oral appliance comprising a cross-linked thermoplastic material may not require blockout of the oral model before thermoforming. Accordingly, a re-molded oral appliance comprising a cross-linked thermoplastic material may result in an improved user fit.

Figure 1B:
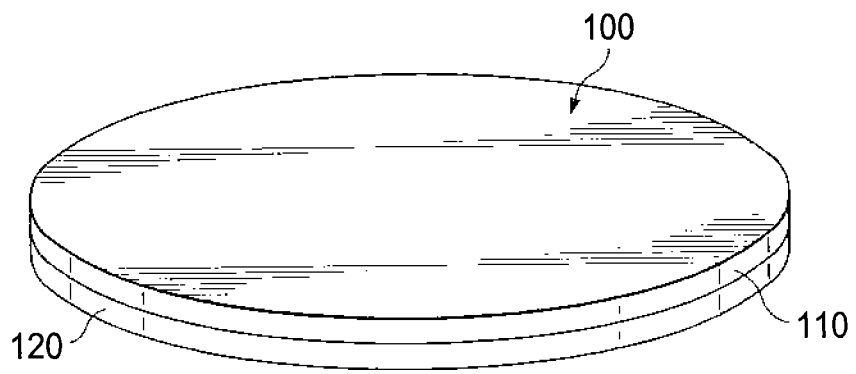
FIG. 1B illustrates an isometric view of the dual-layer disk of FIG. 1, according to one embodiment.

FIGS. 1A-1B illustrate an example of a dual-layer disk 100. Dual-layer disk 100 may be configured to form an oral appliance. In some embodiments, dual-layer disk 100 may be configured to form a custom oral appliance for the dentition of a particular user's mouth. An oral appliance (e.g., oral appliance 400 of FIG. 4) may be formed by thermoforming dual-layer disk 100 over oral molds (e.g., oral mold 200 of FIG. 2). Thermoforming may include the processes of pressure molding, vacuum forming, and blow down.

As illustrated in FIG. 1A, dual-layer disk 100 may be round in shape and sufficient in size to form an oral appliance. In some embodiments, dual-layer disk and/or each layer of dual-layer disk may be configured to fit into standard blow down machines or vacuum formers. For example, dual-layer disk 100 and/or each layer of dual-layer disk 100 may have a diameter of 125 mm. Although this disclosure gives particular examples of the size and shape of dual-layer disk 100 and/or each layer of dual-layer disk 100, this disclosure contemplates that dual-layer disk 100, or each layer thereof, may be of any practical and/or suitable size and shape.

As illustrated in FIG. 1B, dual-layer disk 100 comprises at least a first layer 110 and a second layer 120. First layer 110 may comprise a material different than the material of second layer 120. For example, first layer 110 may comprise a first thermoplastic material and second layer 120 may comprise a second thermoplastic material different than the first thermoplastic material. In some embodiments, first layer 120 may form an outer layer of an oral appliance (e.g., oral appliance 400 of FIG. 4) and second layer 120 may form an inner layer of oral appliance. This disclosure recognizes certain benefits of using a first type of thermoplastic material for first layer 110 and a second type of thermoplastic material for second layer 120, wherein the first type of thermoplastic material has different characteristics than the second thermoplastic material. As an example, the first thermoplastic material may have a higher melting/softening temperature (e.g., 120 degrees Celsius) than the second thermoplastic material (e.g., 60 degrees Celsius). As another example, the first thermoplastic material may be more rigid than the second thermoplastic material. These characteristics of thermoplastic material may, in some embodiments, be critical to the ability of an oral appliance to be remolded post-manufacture. For example, second layer 120 may comprise a second thermoplastic material associated with one or more of a lower melting/softening temperature and/or a lesser rigidity than a first thermoplastic material that is used to form first layer 110. In such an example, a disk 100 comprising first layer 110 and second layer 120 may be thermofolded to form oral appliance 400 in such a way that first layer 110 forms the outer layer of oral appliance 400 and second layer 120 forms the inner layer of oral appliance 400. Subsequently, upon determining that remolding is necessary and/or desired, oral appliance 400 may be heated (e.g., in hot water) to a temperature that causes second layer 120 to soften (e.g., 60 degrees Celsius). Second layer 120 is then remolded by pressing the softened second layer 120 against the user's dentition. Thus, second layer 120 may be configured to be remolded after oral appliance 400 is manufactured. Remolding may be desirable to accommodate user preferences, oral changes, and/or other modifications. Additional details of remolding will be described herein.

First layer 110 and second layer 120 may comprise the same or different thicknesses. As an example, first layer 110 may have a thickness between 0.5 and 2.0 mm and second layer 120 may have a thickness between 0.3 and 3.0 mm. In certain embodiments, first layer 110 has a thickness between 0.90 mm and 1.10 mm (e.g., approximately 1.0 mm) and second layer 120 has a thickness between 0.5 mm and 0.7 mm (e.g., approximately 0.6 mm). First layer 110 may have a thickness between 1.5 mm and 2. mm (e.g., approximately 1.75 mm), for example, when forming a bruxing guard and/or sports mouth guard. Generally, dual-layer disk 100 may be thermoformed (e.g., by a blow down machine or vacuum former) over a custom oral mold (e.g., oral mold 200 of FIG. 2) to form an oral appliance (e.g., oral appliance 400 of FIG. 4). As will be described in further detail below, first layer 110 may form the outer surface (e.g., contacting tongue) of oral appliance 400 and second layer 120 may form the inner surface (e.g., contacting teeth) of oral appliance 400.

First layer 110 may be primarily composed of a substantially rigid material, such as polycarbonate (PC) or any other material providing substantial rigidity while allowing moderate flexion (e.g., polyethylene terephthalate glycol-modified ("PETG")). Embodiments utilizing polycarbonate may improve the ability of first layer 110 to adhere to second layer 120. As a result of the material forming first layer 110, first layer 110 may have a form that does not substantially change when heated to a temperature that would soften the moldable material of second layer 120. For example, first layer 110 may be composed of a material that substantially maintains its shape when heated up to at least 100 degrees Celsius. Such materials may include polycarbonate, acrylonitrile butadiene styrene (ABS), or polyethylene. Although this disclosure describes particular materials that may comprise first layer 110, this disclosure recognizes that first layer 110 may comprise any suitable material. In some embodiments, a suitable material for first layer 110 includes materials that may be thermoformed and/or materials that may chemically bond to the material comprising second layer 120. In some embodiments, dual-layer disk 100 is formed by chemically bonding first layer 110 and second layer 120. For example, first layer 110 and second layer 120 may chemically bond during the holding process to form dual-layer disk 100 and/or during the co-molding and/or the over holding of first layer 110 and second layer 120.

Second layer 120 is composed of a material (e.g., a thermoplastic) that can be heated to a temperature at which the material softens and becomes capable of being molded to a different shape. In certain instances, the material can be heated in hot or boiling water. The temperature range at which the material softens is approximately 40 to 80 degrees Celsius, although materials with other softening ranges may be used. In a particular embodiment, the target softening temperature may be approximately 60 degrees Celsius. In certain embodiments, this material may be a thermoplastic. Such thermoplastic materials may be heated to a temperature at which the thermoplastic becomes soft and moldable, at which point it may be molded to the shape of at least a portion of a user's dental arch and become at least temporarily fixed in that shape. By heating and remolding second layer 120 (e.g., by pressing moldable material against the teeth) of a manufactured oral appliance (e.g., oral appliance 400 of FIG. 4), a user can form an improved mold of the user's teeth which may provide a better and/or more comfortable user fit.

As one example, second layer 120 may comprise a polycaprolactone ("PCL") polymer or other aliphatic polyester. As an example, second layer 120 may comprise CAPA 6500. In particular embodiments, the thermoplastic material may comprise a cross-linked polycaprolactone reinforced with an aramid fiber such as the short length aramid fiber sold by Dupont under the brand name Kevlar®. In certain embodiments, using polycaprolactone combined with Kevlar® may allow second layer 120 to soften at low temperatures and set hard at temperatures of approximately 60 degrees Celsius. In certain embodiments, using polycaprolactone combined with Kevlar® may improve the hardness of second layer 120 following the molding process, which may improve the ability of second layer 120 to hold its shape. In certain embodiments, this increased hardness may also improve the ability of second layer 120 to hold its shape for longer periods of time. For example, in certain embodiments, this may allow second layer 120 to substantially hold its shape for periods longer than approximately 1 month, though such period is not required. Using polycaprolactone combined with Kevlar® may also allow for thinner embodiments of second layer 120, which may allow an oral appliance comprising second layer 120 to take up less space in a user's mouth. Examples of polycaprolactone combined with an aramid fiber, including Kevlar® and a variety of other fibers, are described in U.S. application Ser. No. 11/368,991, publication number U.S. 2007/0004993 A1, which is incorporated herein by reference. Such embodiments may provide an improved moldable material that better maintains its form when heated, providing increased viscosity which may prevent the material from flowing excessively around the user's teeth and/or getting stuck on the user's teeth during the molding process. Such embodiments may also possess increased strength after molding.

The thermoplastic material may be cross-linked by radiation, which may create cross-linking of certain molecules to improve the material's shape retention characteristics and/or make the material better able to return to its original shape after reheating. In certain embodiments, radiation is applied after forming dual-layer disk 100. In other embodiments, radiation is applied after forming second layer 120 but before forming dual-layer disk 100. In yet other embodiments, radiation is applied after dual-layer disk 100 has been thermoformed over an oral mold (see e.g., oral appliance 400 formed over oral mold 200 of FIG. 4), but before being molded to the user, though this is not required. Cross-linking by radiation may provide improved shape-retention characteristics, such that second layer 120 may be better able to return to its manufactured shape (e.g., shape of second layer 120) under certain conditions. Cross-linking by radiation is further described in U.S. Pat. No. 5,415,623, which is incorporated herein by reference.

Cross-linking certain molecules of second layer 120 by applying radiation may allow second layer 120 to be shaped to conform to the user's dentition while having improved memory, such that second layer 120 may be better able to return to its manufactured shape under certain conditions. Second layer 210 may have a first shape that may be partially or substantially defined by the memory. The term "memory" is used herein to describe the characteristic of plastics or polymeric materials to return to an original shape after distortion from the original shape into a second shape. Distortion from the original shape to the second shape may occur, for example, during post-manufacture molding processes such as when a user or dentist desires a better and/or more comfortable user fit for the oral appliance. Returning to the original or "preform" shape may occur under certain conditions, such as, for example, heating to a temperature greater than the melting temperature of the material of second layer 120. The first (or "preform") shape can be imparted memory by various means depending upon the particular plastic or polymeric material used. For example, memory can be imparted to the first shape by mechanical forming, chemical radiation or other cross-linking, predetermined stretching, molding in place, or other known procedures.

Certain materials that are capable of having a memory imparted to them include, but are not limited to, caprolactone polymer (sometimes known as oxepanone polymer), which may be a polymer having the formula:

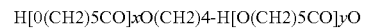

Caprolactone polymer may also be initiated with butane diol. Other materials may include poly(ethylene adipate), poly(epsilon-caprolactone), polyvinyl stearate cellulose acetate butyrate, ethyl cellulose, any suitable material, or any suitable combination thereof. In certain embodiments, second layer 120 is formed from a polymeric material, such as a caprolactone polymer, which has a molecular weight of about 50,000, a melting point of about 58 to 60 degrees Celsius, a specific gravity of 1.10 at 20 degrees Celsius, and a viscosity of 1.5 million centipoises at 100 degrees Celsius. In some embodiments, second layer 120 is formed from an extruded sheet of low temperature plastic stock material using, for example, the materials listed above or any suitable combination thereof.

After forming second layer 120, second layer 120 may be cross-linked by radiation. In some embodiments, second layer 120 is irradiated between 1 and 15 kGy (e.g., approximately 5 kGy) which may be performed, for example, using a cobalt gamma irradiator. In certain embodiments, second layer 120 is irradiated between 1.5 and 2.5 kGy (e.g., approximately 2 kGy). As another example, irradiation may be performed using electron beam irradiation. As described herein, irradiation may occur before and/or after first layer 110 and second layer 120 are fused to form dual-layer disk 100. In some embodiments, dual-layer disk 100 is thereafter thermoformed over models (e.g., oral mold 200) in order to create a custom oral appliance (e.g., oral appliance 400). Because the custom oral appliance comprises cross-linked second layer 120, second layer 120 may have certain properties that permit post-manufacture reshaping such that a user may submerge oral appliance 400 in heated liquid and remold second layer 120 to conform to the user's dentition as described above. Following post-manufacture reshaping, second layer 120 may remain stiff and substantially unyielding at ambient temperatures.

In certain embodiments, the material may exhibit slight shrinkage after being re-molded to the user's dental arch. In particular embodiments, such shrinkage may be less than 1%. Slight shrinkage of the material following the remolding process may allow for improved fit with the user's dental arch. In some embodiments, slight shrinkage of the material following the remolding process may allow oral appliance 400 to have a "snap" fit with the user's dental arch.

As described above, dual-layer disk 100 may comprise two layers (e.g., first layer 110 and second layer 120) in some embodiments. In other embodiments, dual-layer disk 100 may comprise more than two layers. For example, dual-layer disk 100 may comprise three layers, first layer 110 comprising a first thermoplastic material, second layer 120 comprising a second thermoplastic material, and a third layer comprising a third thermoplastic material. In such an example, the thermoplastic material comprising the innermost layer (e.g., second layer 120) of oral appliance 400 may have a lower melting point than the thermoplastic materials comprising the outer layers of oral appliance 400. In some embodiments, the first and third thermoplastic materials may be the same. In other embodiments, first and third thermoplastic materials may be different.

Dual-layer disk 100 may be manufactured in any suitable manner. As an example, dual-layer disk 100 may be manufactured by forming first layer 110 of a first material (e.g., a first thermoplastic) and depositing a second material (e.g., a second thermoplastic) on top of first layer 110 to form second layer 120. As another example, first layer 110 and second layer 120 may be manufactured separately and then fused together (e.g., chemically bonded) to form dual-layer disk 100. First layer 110 and/or second layer 120 of dual-layer disk 100 may be manufactured by injection molding, cold molding, extrusion, and/or stamping. Although this disclosure describes particular methods of forming layers of dual-layer disk 100, this disclosure contemplates forming layers of dual-layer disk 100 using any suitable method. In some embodiments, the shape of first layer 110 and/or second layer 120 is the same shape of the intended shape of dual-layer disk 110. For example, first layer 110 and second layer 120 may be cold molded into the shape of a circle in order to form a circular dual-layer disk 100. As another example, the material of first layer 110 may be stamped into the shape of a circle and the material of second layer 110 may be deposited and leveled onto the circular first layer 110 to form a circular second layer 120 in order to form a circular dual-layer disk 100.

Figure 2:
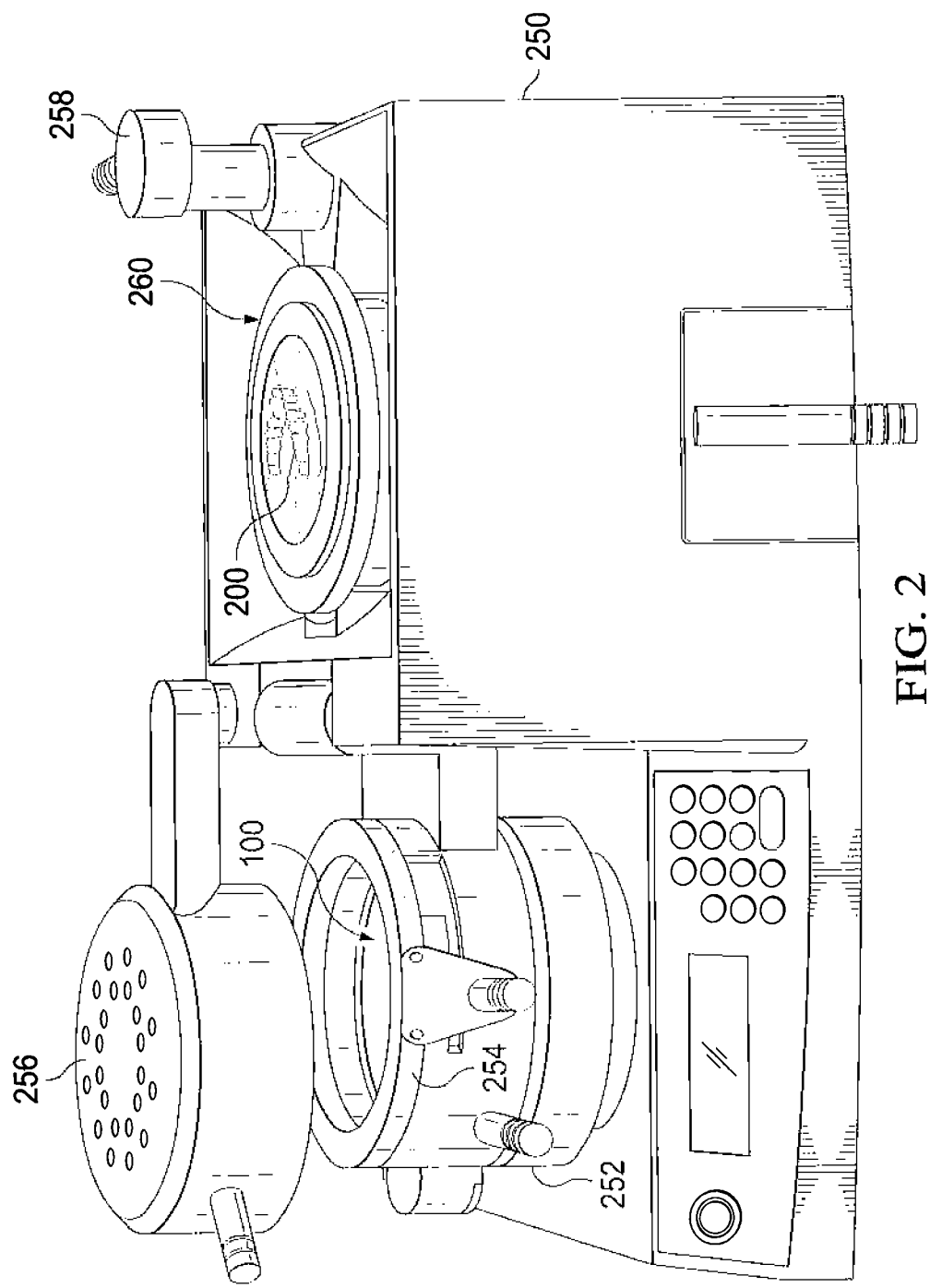
FIGS. 2-3 illustrate a front view of a pressure molding machine at a first and a second stage of a molding process, according to certain embodiments.
Figure 3:
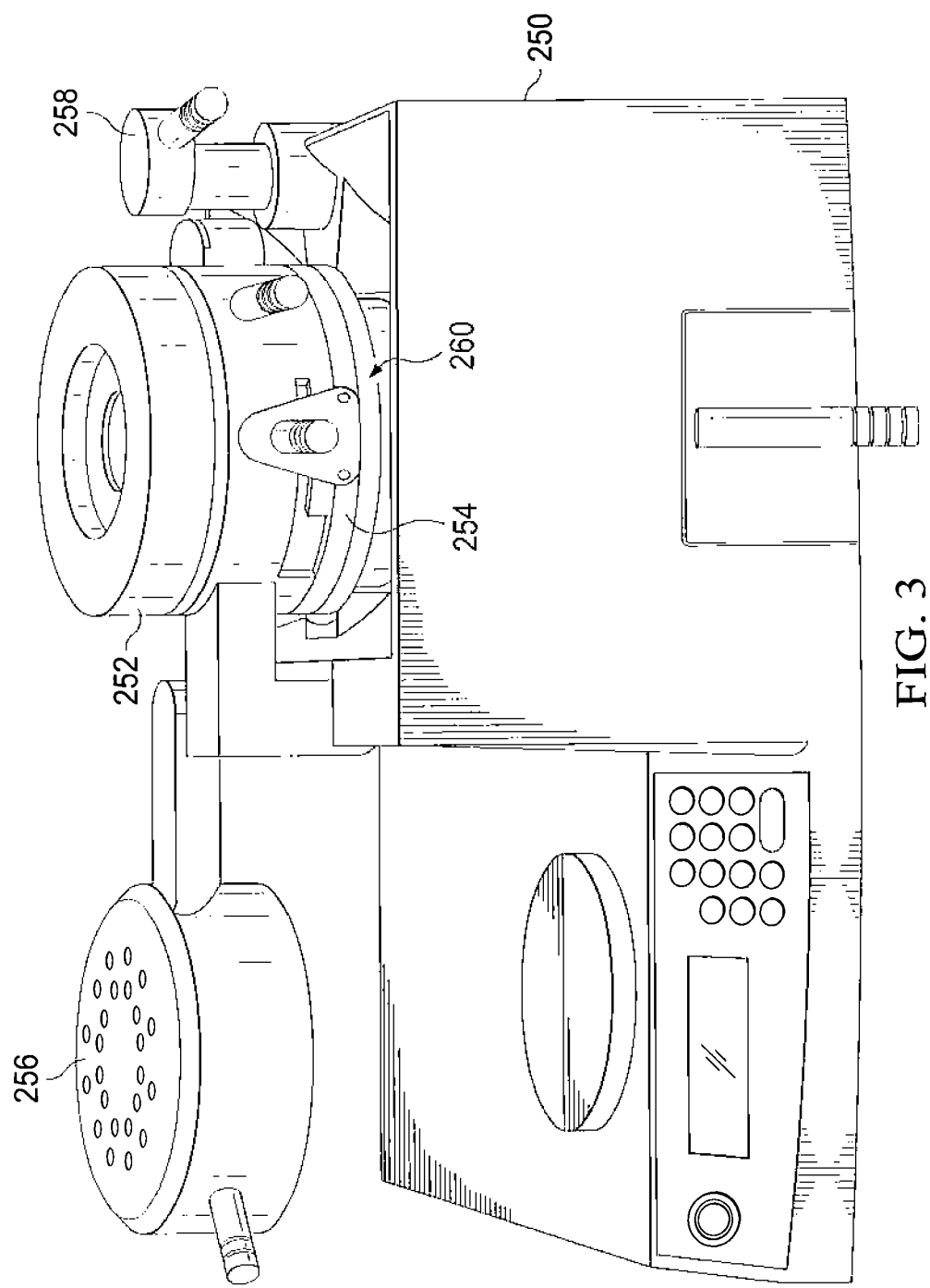
Figure 4:
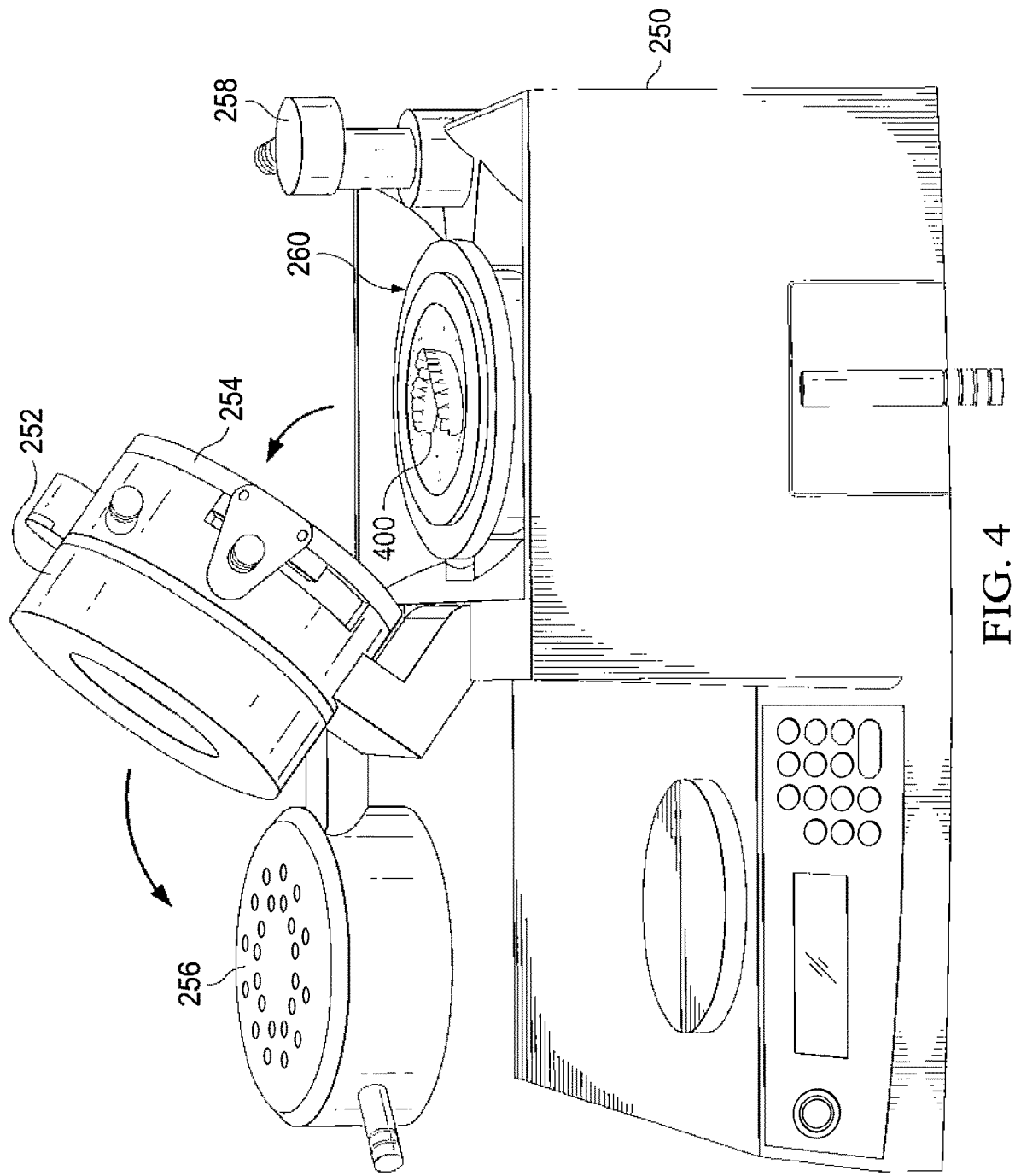
FIG. 4 illustrates an isometric view of the pressure molding machine of FIGS. 2-3 at a third stage of a molding process, according to certain embodiments.

FIGS. 2-4 illustrate an example of a pressure molding machine 250 at different stages of a molding process. Pressure molding machine 250 may be configured to mold any number of items, including but not limited to oral appliances. In some embodiments, such as the embodiment illustrated in FIGS. 2-4, pressure molding machine 250 comprises a pressure chamber 252, a clamping frame 254, a heating element 256, a locking handle 258, and a molding platform 260. As will be described in reference to FIGS. 2-4, pressure molding machine 250 may be used to thermoform oral appliance 400 from dual-layer disk 100.

Pressure chamber 252 is a compartment configured to receive and retain a disk of material (e.g., dual-layer disk 100 or one or more layers of dual-layer disk 100) through one or more molding steps. For example, pressure chamber 252 may be configured to receive a disk of material and retain the disk during the pendency of heating and/or forming steps of the molding process. Clamping frame 254 may be configured to secure the disk of material to pressure chamber 252. Heating element 256 may be configured to apply heat to the disk of material. In some embodiments, such as the embodiment illustrated in FIGS. 2-4, heating element 256 is configured to swivel from an active position to a resting position. As used herein, an "active position" refers to a usable position of heating element 256 (such that heating element 256 can apply heat to the disk of material) and a "resting position" refers to an unusable position of heating element 256 (such that heating element 256 is not properly positioned to apply heat to the disk of material). In the illustrated embodiment, pressure chamber 252 (along with clamping frame 254) is configured to swing from a first (preparatory) position (see e.g., FIG. 2) to a second (molding) position (see e.g., FIG. 3), wherein the pressure chamber 252 is substantially positioned above molding platform 260 when in the molding position. In some embodiments, molding platform 260 is configured to support an oral mold 200. The embodiment of FIGS. 2-4 also includes locking handle 258 which may be configured to move from an unlocked position (see e.g., FIGS. 2 and 4) to a locked position (see e.g., FIG. 2). In some embodiments, pressure chamber 252 is secured in the molding position when locking handle 258 is in the locked position. Additionally, in some embodiments, moving locking handle 258 into the locked position may activate the pressurization of pressure chamber 252.

FIG. 2 illustrates pressure molding machine 250 in the preparatory position. In some embodiments, a disk of material (illustrated as dual-layer disk 100) is positioned on and/or in pressure chamber 252. In some embodiments, the orientation of dual-layer disk 100 on and/or in pressure chamber 252 may be important. As an example, it may be desirable to orient dual-layer disk 100 such that the first layer 110, comprising a more rigid thermoplastic material than second layer 120, is nearer to the base of pressure chamber 252 and second layer 120 is nearer to clamping frame 254. In doing such, the second layer 120 may form the inner surface of oral appliance 400 and the first layer 110 may form the outer surface of oral appliance 400. As described above, second layer 120 of disk 100 may have been irradiated such that the material comprising second layer 120 is cross-linked. As explained above, cross-linking the material comprising second layer 120 may have certain advantages. For example, cross-linking the material comprising second layer 120 may prevent the material of second layer 120 from becoming fluid and flowing away during the thermoforming process (e.g., at temperatures exceeding the melting/softening point of the material of second layer 120).

In some embodiments, dual-layer disk 100 may be secured in and/or to pressure chamber 252 using clamping frame 254 after being oriented as desired. In some embodiments, heat is applied to dual-layer disk 100 using heating element 256. Heating element 256 may be swiveled into the active position when applying heat to dual-layer disk 100 and returned to the resting position once heat has been applied to dual-layer disk 100. In some embodiments, dual-layer disk 100 is sufficiently heated when the material(s) comprising dual-layer disk 100 have reached their melting/softening points. The temperature and duration of the heat applied may depend on the composition and/or thickness of each layer of dual-layer disk 100. For example, dual-layer disk 100 comprising a first layer 110 composed of PETG and a second layer 120 composed of CAPA 6500 may be heated to a temperature between 135-235 degrees Celsius. In such an example, the duration of heating may be between 45-75 seconds. As stated above, cross-linking of the material of second layer 120 may prevent the material of second layer 120 from becoming fluid and flowing away.

As illustrated in FIG. 2, oral mold 200 may be positioned on/atop molding platform 260. In some embodiments, oral mold 200 may be a custom mold of a particular user's dentition. Oral mold 200 may be received from a dental practitioner. In certain embodiments, oral mold 200 is a casting formed by pouring plaster into dental impressions taken by a dental practitioner. In other embodiments, oral mold 200 may be a custom mold printed (e.g., 3D-printed) from dental scans received from a dental practitioner. Although this disclosure describes particular exemplary origins for oral mold 200, this disclosure recognizes that oral mold 200 may result from any suitable origin, including but not limited to over-the counter impressions that a user took himself/herself.

FIG. 3 illustrates pressure molding machine 250 in the molding position. In some embodiments, pressure chamber 252 is swung from the preparatory position to the molding position after applying sufficient heating to dual-layer disk 100. As illustrated in FIG. 3, locking handle 258 is in the locked position. As described above, moving locking handle 258 into the locked position may secure pressure chamber 252 in the molding position and activate the flow of air pressure into pressure chamber 252. Additionally, when pressure chamber 252 is in the molding position, the material(s) of heated dual-layer disk 100 will distribute over oral mold 200. Pressurizing pressure chamber 252 forces the material(s) of dual-layer disk 100 into contact with all surfaces of oral mold 200, thereby creating oral appliance 400. In some embodiments, pressurizing pressure chamber 252 also results in the cooling of the heated material(s). Duration of cooling may depend on the materials comprising dual-layer disk 100 and/or the thickness of dual-layer disk 100 (e.g., thickness of layers 110, 120). As an example, cooling time of dual-layer disk may be between 135-165 seconds. In some embodiments, an operator of pressure molding machine 250 may configure various settings of the pressure molding machine 250, including but not limited to the amount of pressure delivered to pressure chamber 252, the amount of time that pressure is delivered to pressure chamber 252, the temperature of the heat applied by heating element 256, and/or the amount of time that heat is applied to pressure chamber 252. Additionally, this disclosure recognizes that cooling time may also be adjusted. In some embodiments, cooling time may be adjusted based on a desired amount of retention. Less cooling time may lead to less retention and more cooling time may lead to more retention. Although this disclosure describes particular settings that may be adjusted by an operator of pressure molding machine 250, this disclosure contemplates that an operator may adjust any desired setting to better form oral appliance 400.

FIG. 4 illustrates pressure molding machine 250 after oral appliance 400 is formed. As illustrated, locking handle 258 is in the unlocked position, permitting the rotation of pressure chamber 252 back to the preparatory position. In some embodiments, the pressure in pressure chamber 252 must be released prior to moving locking handle 258 into the unlocked position and/or moving pressure chamber 252 to the preparatory position. Swiveling pressure chamber 252 back to the preparatory position reveals oral appliance 400 around oral mold 200 on molding platform 260. In some embodiments, oral appliance 400 is manipulated to separate from oral mold 200. Oral appliance 400 may then be delivered to a patient for use.

As described above, it is not uncommon for oral devices to not fit their intended user properly and/or comfortably even though a device may be customized for a particular user. In embodiments wherein the inner surface of oral appliance 400 comprises a thermoplastic material, oral appliance 400 may be re-formed post-manufacture to ensure a proper and/or more comfortable user fit. Reformation may be performed by submerging oral appliance 400 in water having a temperature high enough to deform the material comprising second layer 120 but low enough such that the material comprising first layer 110 of oral appliance 400 is not deformed. As an example, reformation occur by submerging oral appliance 400 in water heated to a temperature between 40° C. and 80° C. In some embodiments, submerging oral appliance 400 in heated liquid post-manufacture may soften second layer 120 (the inner layer) of oral appliance 400 into a moldable material which may then be pressed into the user's dentition to update the fit of oral appliance 400. Accordingly, oral appliance 400 may possess characteristics that permit remolding post-manufacture to accommodate user-specific comfort, oral changes and/or other modifications.

This remolding (refitting) can occur in any location, such as in the dental office ('chair side'), in any other clinical setting, or in the users' home. This is a benefit over conventional practices, wherein an ill-fitting oral appliance 400 had to be sent back to the laboratory that fabricated oral appliance 400, or required the dental practitioner to engage in this activity. The refitting can be assisted by a dental/medical professional, medical/dental assistant, sales person or by the user. Refitting may, in some cases, simply involve heating second layer 120 of oral appliance 400, for example in hot water, to above the melt or softening temperature of second layer 120. Once softened, oral appliance 400 can be refitted to the users mouth, such that the soft second layer 120 will form to the shape of the users teeth. Second layer 120 may thereafter cool and set to the shape of the users teeth. Depending on the fit required, the user can leave oral appliance 400 in his/her mouth for a longer or shorter period. The longer the period of setting, the firmer the fit will be as second layer 120 will be more set to the users teeth. Conversely, removing the oral appliance 400 earlier will cause some of the areas of significant undercuts (areas of retention) to be smoothed out or removed as the semi-set second layer 120 is removed from the teeth.

In embodiments wherein second layer 120 is formed with cross-linked material, reheating second layer 120 causes the material to transition back to a relatively uniform layer, of for example 2.0 mm, as the cross-linked material has shape memory of its original form. In some embodiments, the outer layer of oral appliance 400 (e.g., first layer 110) has a melt temperature that is higher (over 100 degrees Celsius). As such, first layer 110 may not change shape during the refitting process, but provides support to second layer 120, in the general form of the patient teeth or arch. Thus the first layer 110 provides the custom fit to the general shape of the users arch, while in second layer 120 allows the fit of the device to be adjusted as necessary.

The use of a cross-linked inner layer (e.g., second layer 120), combined with the more rigid outer layer (e.g., first layer 110), enables the refitting process to be repeated over time, as much as is necessary without any significant drop in the resulting fit. Conventional custom oral appliances are not cross-linked and generally not remoldable. Existing oral appliances that are remoldable generally do not have shape memory, and as such, are only remoldable a small number of times before they lose their performance.

One specific advantage of remolding oral appliance 400 post-manufacture is the ability for oral appliance 400 to achieve a desired amount of retention without blockout. This disclosure recognizes that retention may be controlled, at least in part, based on cooling times. As an example, longer cooling times may be associated with more retention and shorter cooling times may be associated with less retention. Conventionally, desired levels of retention are achieved by blockout, which as used herein, refers to the process of adding material to an oral model (e.g., oral model 200) prior to thermofolding to prevent the oral appliance (e.g., oral appliance 400) forming around small holes and gaps between the teeth that may result in excessive retention.

In some embodiments, oral appliance 400 may be customized further post-manufacture. As an example, brackets and/or spacers may be added to oral appliance 400. As another example, tension elements for repositioning a user's jaw may be added to oral appliance 400. Although specific examples have been provided, this disclosure contemplates that oral appliance 400 may be fabricated post-manufacture by adding any suitable or desirable hardware.

Figure 5:
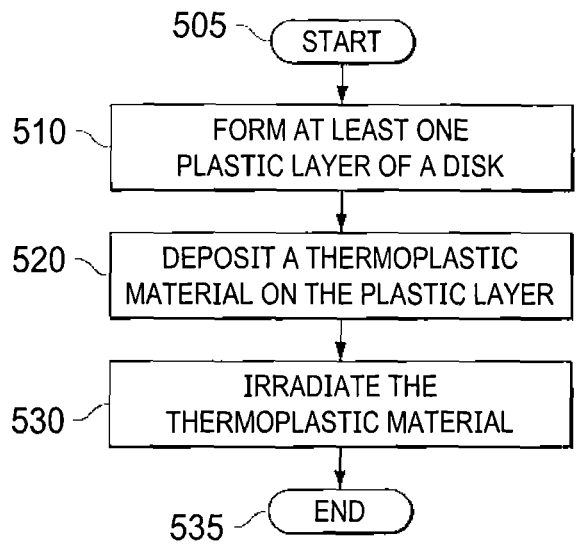
FIG. 5 is a flow chart illustrating a method of manufacturing the dual-layer disk of FIGS. 1A and 1B, according to certain embodiments.

FIG. 5 illustrates a method 500 of forming dual-layer disk 100 of FIGS. 1A and 1B. As described above, dual-layer disk 100 may be formed in a plurality of ways and method 500 is only one exemplary method of forming dual-layer disk 100. Method 500 may begin in step 505 and continue to step 510. At step 510, a first layer (e.g., first layer 110) of dual-layer disk 100 is formed. First layer 110 may be formed through one or more of injection molding, cold molding, extrusion, and/or stamping. In some embodiments, first layer 110 comprises a first material. First material may be relatively hard and be associated with a high melting/softening temperature (e.g., 135-225 degrees Celsius). First layer 110 may be of any suitable shape and size. In some embodiments, first layer 110 is circular in shape and the size is suitable to form over oral mold 200. As an example, first layer 110 may be approximately 125.0 mm in diameter. In some embodiments, method 500 proceeds to step 520.

At step 520, a second layer (e.g., second layer 120) is deposited on first layer 110. In some embodiments, second layer 120 comprises a second material. Second material comprising second layer 120 may be different than the first material comprising first layer 110. The material of second layer 120 may be selected based on certain desirable characteristics. For example, a material having a low melting/softening temperature (e.g., 55-65 degrees Celsius) may be desirable. As another example, it may be desirable to select a material that has excellent retention and durability properties. Second layer 120 may comprise a material that expands to the top edges of first layer 110 such that second layer 120 takes the shape of first layer 110. As an example, second layer 120 may form atop first layer 110 without extending over the top edges of first layer 110. In some embodiments, second layer 120 may be thicker than first layer 120. As an example, second layer 120 may be approximately 2.0 mm thick and first layer 110 may be approximately 1.0 mm thick. In some embodiments, method 500 proceeds to step 530.

At step 530, radiation is applied to second layer 120. In some embodiments, irradiating second layer 120 results in cross-linking of the material forming second layer 120. Second layer 120 may be irradiated to approximately 5 kGy (e.g., between 2-15 kGy) in some embodiments. Cross-linking certain molecules of second layer 120 may allow second layer 120 to be shaped to conform to the user's dentition while having improved memory, such that second layer 120 may be better able to return to its manufactured shape under certain conditions. In some embodiments, the method 500 proceeds to an end step 535. The dual-layer disk 100 that is formed from the method 500 may, in some embodiments, be used to form a custom oral appliance that may be re-molded to improve user fit. An example method of forming such custom oral appliance from dual-layer disk 100 is described below in reference to FIG. 6.

Figure 6:
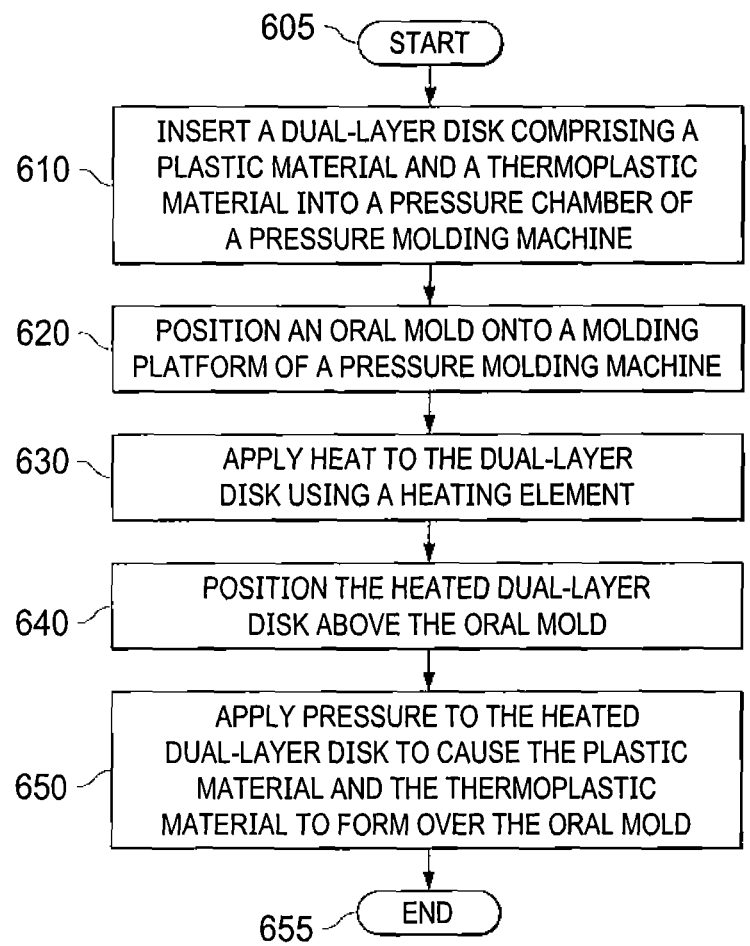
FIG. 6 is a flow chart illustrating a method of manufacturing an oral appliance using the dual-layer disk of FIGS. 1A and 1B, according to certain embodiments.

FIG. 6 illustrates a method 600 of forming a custom oral appliance. As described above, a custom oral appliance may be manufactured by thermoforming dual-layer disk 100. Dual-layer disk 100 may be thermofolded in a plurality of ways, including using vacuum formers and/or blow down machines such as pressure molding machines. Method 600 is an exemplary method of forming a custom oral appliance. In some embodiments, an operator in a dental laboratory performs method 600. The operator may begin in step 605 and continue to step 610. At step 610, a dual-layer disk 100 may be inserted into a pressure chamber (e.g., pressure chamber 252) of a pressure molding machine (e.g., pressure molding machine 250). In some embodiments, dual-layer disk 100 comprises a first layer (e.g., first layer 110) and a second layer (e.g., second layer 120). In some embodiments, first layer 110 may comprise a first material and second layer 120 may comprise an irradiated second material, wherein the first material is associated with a higher melting/softening temperature than second material and/or the first material is more rigid than the second material. In such an embodiment, the orientation of dual-layer disk 100 in pressure chamber 252 may be relevant. For example, second layer 120 of dual-layer disk may require particular orientation relative to first layer 110 depending on whether it is desirable for first layer 110 or second layer 120 to form the inner or outer surface of oral appliance 400. As described herein, this disclosure recognizes certain advantages to forming oral appliance 400 with the inner surface comprising thermoplastic material. Thus, in some embodiments, dual-layer disk 100 may be oriented in a way that permits second layer 120 to form the inner surface of oral appliance 400. Some pressure molding machines may include a clamping frame (e.g., clamping frame 254). In such machines, it may be desirable to secure dual-layer disk 100 in pressure chamber 252 using clamping frame 254. In some embodiments, the method 600 proceeds to step 620.

At step 620, an oral mold (e.g., oral mold 200) is positioned on a molding platform (e.g., molding platform 260) of pressure molding machine 250. In some embodiments, oral mold 200 is positioned in the center of molding platform 260 to ensure even distribution of dual-layer disk 100 on oral mold 200. Oral mold 200 is generally positioned such that dental impressions do not contact molding platform 260. Rather, dental impressions of oral mold 200 generally face upwards so that the material(s) of dual-layer disk 100 may form over the dental impressions. Some embodiments of pressure molding machine 250 may utilize a pellet cup comprising pellets in lieu of a molding platform 260. In such embodiments, arrangement of pellets around oral mold 200 may be necessary. In some embodiments, the method 600 proceeds to step 630.

At step 630, heat is applied to dual-layer disk 100. In some embodiments, heat is applied to dual-layer disk 100 using a heating element (e.g., heating element 256). Heating element 256 may be, in some embodiments, a component of pressure molding machine 250. In other embodiments, dual-layer disk 100 may be heated using a heating element 256 external to pressure molding machine 250. The temperature and duration of applied heat may be dependent on the materials comprising dual-layer disk 100. For example, dual-layer disk 100 comprising a first layer 110 composed of PETG and a second layer 120 composed of PCL may be heated at a temperature of 135-160 degrees Celsius. In some embodiments, heating dual-layer disk to such temperature for such duration melts the materials of both first layer 110 and second layer 120. In some embodiments, method 600 proceeds to step 640.

At step 640, the heated dual-layer disk 100 is positioned above oral mold 200. Positioning the heated dual-layer disk 100 may, in some embodiments, result in the melted materials of first layer 110 and second layer 120 forming over oral mold 200. In some embodiments, it may be desirable to form a layer comprising irradiated second material over oral mold 200 before forming a layer comprising first material over oral mold 200. In some embodiments, the method 600 proceeds to step 650.

At step 650, pressure is applied to the melted material(s) of dual-layer disk 100 such that the material(s) conform to all surfaces of oral mold 200. In some embodiments, pressurizing the material(s) of dual-layer disk 100 also cools the material such that oral appliance 400 may be separated from oral mold 200. In some embodiments, the pressure applied to the melted material(s) and the duration of pressure application is based on the materials comprising first layer 110 and/or second layer 120. In some embodiments, the method 600 proceeds to an end step 655.

Additional methods contemplated herein may comprise one, some, or all of the steps recited in methods 500 and/or 600. Other methods may comprise one or more additional steps. For example, instead of proceeding to end step 655, the method 600 may include one or more of the following steps: (1) separating the formed dual-layer disk from the oral mold; (2) adding hardware to the formed dual-layer disk; and (3) inserting a second disk comprising a third material into a pressure chamber of a pressure molding machine; (4) positioning the formed dual-layer disk on a molding platform of the pressure molding machine; (5) applying heat to the second disk using a heating element, wherein applying heat to the second disk causes the third material to melt; (6) positioning the heated second disk above the oral mold; (7) applying pressure to the heated second disk to cause the third material to form over the formed dual-layer disk. In some cases, these steps may be performed in order to set hardware on an oral appliance. As an example, these steps may be applicable when forming an oral appliance such as a Thornton Adjustable Positioner (TAP) appliance. These steps may not be applicable if, for example, the oral appliance being formed is a bruxing guard or sports mouth guard.

In some embodiments, the third material is a material having substantial rigidity while allowing moderate flexion. As an example, the third material may comprise PETG or polycarbonate. Although this disclosure identifies certain materials that may comprise the third material, this disclosure contemplates that the third material may comprise any material that adds strength to the oral appliance and secures hardware in place. The third material may range in thickness from 0.75 mm to 2.5 mm. In certain embodiments, the thickness of third material is between 1.75 mm and 2.25 mm (e.g., approximately 2 mm). In certain other embodiments, the thickness of third material is between 1.25 mm and 1.74 mm (e.g., approximately 1.5 mm). In yet other certain embodiments, the thickness of third material is between 0.75 mm and 1.24 mm (e.g., approximately 1.0 mm).

Although this disclosure describes and depicts pressure molding dual-layer disk 100 into oral appliance 400, this disclosure contemplates that each layer of dual-layer disk 100 (e.g., first layer 110 and second layer 120) may be pressure molded separately to form an oral appliance having both first layer 110 and second layer 110. This process may comprise inserting a disk comprising a first material (e.g., thermoplastic) into pressure chamber 252, heating the disk comprising the first material (e.g., using heating element 256), positioning heated disk comprising the first material above oral mold 200, and applying pressure to the heated disk comprising the first material such that the disk comprising the first material forms over oral mold 200, creating an oral appliance comprising the first material. Thereafter, a disk comprising a second material may be inserted into pressure chamber 252 and heated (e.g., using heating element 256). The heated disk comprising the second material may then be positioned above either (1) oral mold 200 comprising the layer of first material, or (2) oral appliance 400 comprising the first material, and pressurized such that the disk comprising the second material forms over either the (1) oral mold 200 comprising the layer of first material, or (2) oral appliance 400 comprising the first material. In doing so, an oral appliance 400 comprising the first material and second material is formed. As explained above, the first material may, in some embodiments, be a first thermoplastic material and the second material may, in some embodiments, be a second thermoplastic material.

As described above in reference to FIG. 1, this disclosure contemplates forming oral appliance 400 from dual-layer disk 100 using other methods of thermofolding such as vacuum forming. Generally, forming oral appliance 400 by vacuum forming may involve one or more of the following steps: (1) heating dual-layer disk 100 (or each layer thereof) to a forming temperature; (2) stretching or draping the heated dual-layer disk 100 over an oral mold (e.g., oral mold 200); (3) applying a vacuum to force dual-layer disk 100 against oral mold 200; and (4) separating the produced oral appliance 400 from oral mold 200 once dual-layer disk has cooled. The orientation of dual-layer disk 100 may be important during the vacuum forming process. This disclosure recognizes certain benefits to orienting dual-layer disk 100 in a way that positions a thermoplastic layer nearest to oral mold 200 such that the thermoplastic layer forms the inner surface (e.g., contacting teeth) of oral appliance 600. For example, forming oral appliance 600 with an inner thermoplastic layer may permit post-manufacture remolding of oral appliance 600.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. A method of thermoforming an oral appliance, the method comprising:
   inserting a dual-layer disk into a pressure chamber of a pressure molding machine, wherein:
      the dual-layer disk comprises a first layer and a second layer;
      the first layer comprises a first material and the second layer comprises a second material, the first material having a higher melting point than the second material; and
      the second material is cross-linked by irradiation;
   positioning an oral mold on a molding platform of the pressure molding machine;
   applying heat to the dual-layer disk using a heating element, wherein applying heat to the dual-layer disk causes the first material and the second material to melt;
   positioning the heated dual-layer disk above the oral mold; and
   applying pressure to the heated dual-layer disk to cause the first material and the second material to form over the oral mold.

2. The method of claim 1, wherein the heated dual-layer disk is positioned above the oral mold such that the second layer is nearer to the oral mold than the first layer.

3. The method of claim 1, further comprising:
   reforming the molded dual-layer disk by:
      softening the second material by submerging the molded dual-layer disk in a liquid having a temperature between 40° C. and 80° C.; and
      pressing the softened second material into a dentition of a user.

4. The method of claim 1, further comprising:
   adding hardware to the molded dual-layer disk;
   heating a second disk comprising a third material; and
   applying pressure to the heated second disk such that the third material forms over the hardware and the molded dual-layer disk.

5. The method of claim 4, wherein the second disk has a thickness between 0.75 mm and 2.5 mm.

6. The method of claim 4, wherein the third material comprises one from the set comprising:
   polycarbonate (PC); and
   polyethylene terephthalate glycol-modified ("PETG").

7. The method of claim 1, wherein the first layer has a thickness between 0.5 mm and 2.0 mm.

8. The method of claim 1, wherein the second layer has a thickness between 0.3 mm and 3.0 mm.

9. The method of claim 1, wherein the first material primarily comprises a substantially rigid material.

10. The method of claim 9, wherein the substantially rigid material is one from the set comprising:
    polycarbonate (PC); and
    polyethylene terephthalate glycol-modified ("PETG").

11. The method of claim 1, wherein the second material comprises one from the set comprising:
    polycaprolactone ("PCL"); and
    aliphatic polyester.

* * * * *